United States Patent [19]

Lyons et al.

[11] Patent Number: 4,900,064
[45] Date of Patent: Feb. 13, 1990

[54] CONNECTOR FOR FIBER DUCT SYSTEMS

[75] Inventors: John Lyons, Levitown; Paul K. Thompson, Brentwood, both of N.Y.

[73] Assignee: Duro Dyne Corporation, Farmingdale, N.Y.

[21] Appl. No.: 371,056

[22] Filed: Jun. 26, 1989

[51] Int. Cl.⁴ .............................................. F16L 11/12
[52] U.S. Cl. ...................................... 285/53; 285/162; 285/373; 285/424
[58] Field of Search ................... 285/53, 162, 194, 424, 285/200, 229

[56] References Cited

U.S. PATENT DOCUMENTS

| | | | |
|---|---|---|---|
| 2,880,017 | 3/1959 | Anderson et al. | 285/162 X |
| 2,935,340 | 5/1960 | Marie | 285/424 X |
| 3,460,856 | 8/1969 | Tine et al. | 285/53 |
| 3,727,663 | 4/1973 | McCabe | 285/424 X |
| 3,958,313 | 5/1976 | Rossborough | 285/162 X |

Primary Examiner—Dave W. Arola
Attorney, Agent, or Firm—Mark T. Basseches; Paula T. Basseches

[57] ABSTRACT

A connector member for coupling flexible cylindrical tubular duct to the wall of a fibrous duct is comprised of a pair of parallel metal strips, the opposed marginal edges of which are connected to a flexible central strip. A clamp and a slip joint are provided on the respective strips for maintaining the metal strips in a cylindrical configuration, with the ends of the strips overlapping. One said strip including outwardly facing gaskets disposed at opposite sides of the wall of the fiber duct, the other strip including an inwardly facing gasket clamped about the flexible cylindrical ducting.

4 Claims, 2 Drawing Sheets

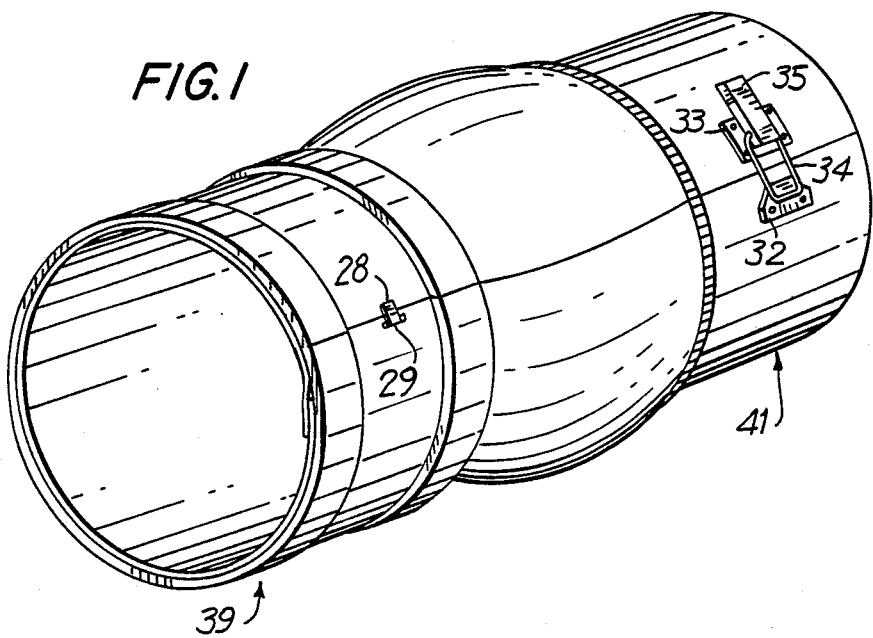
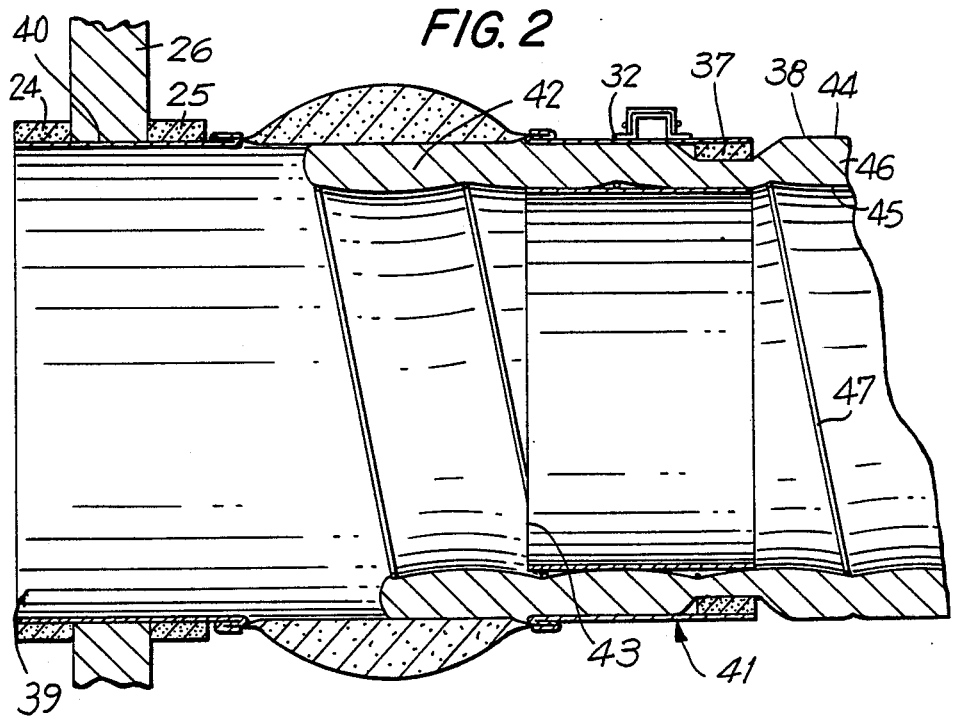

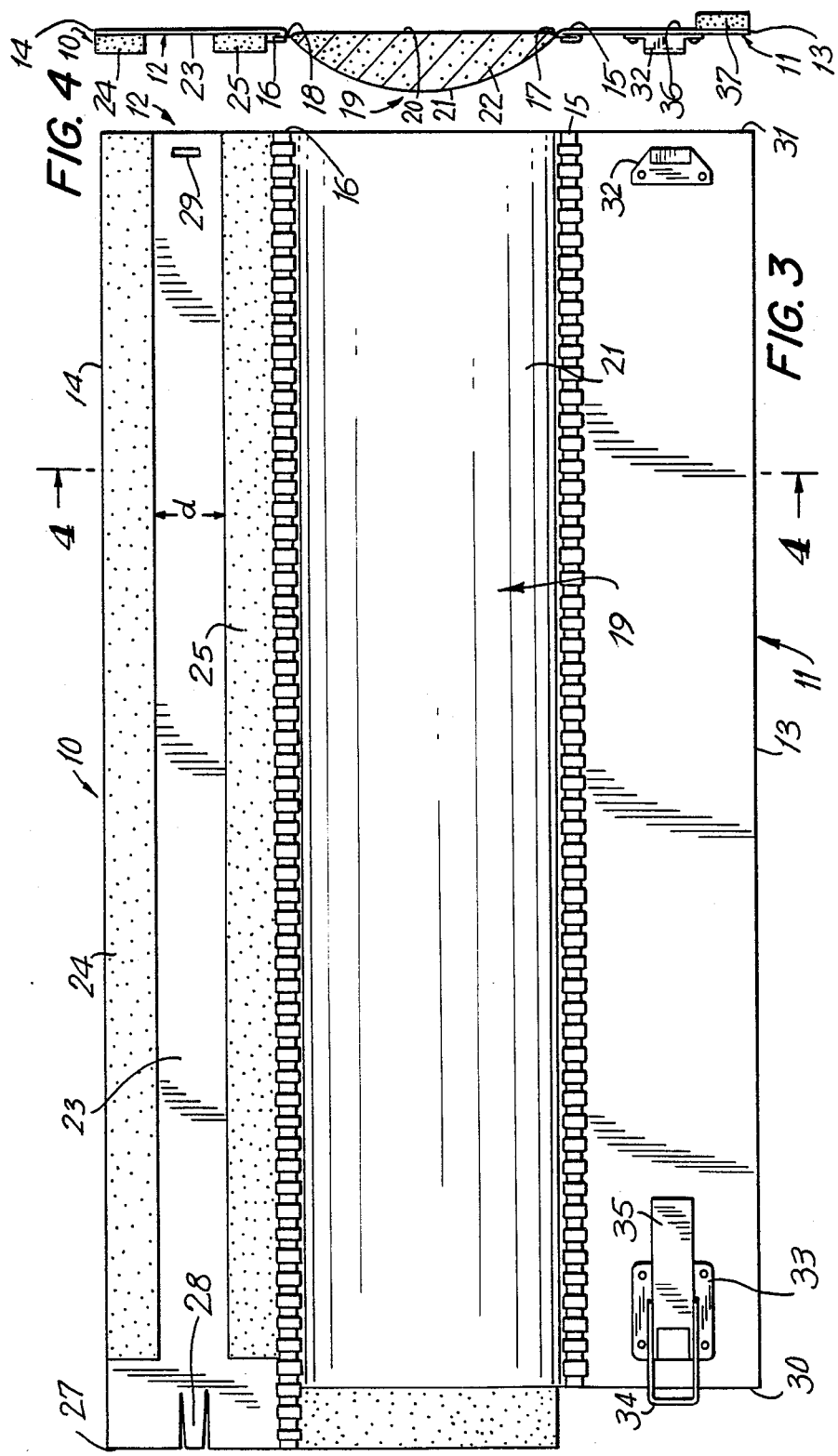

CONNECTOR FOR FIBER DUCT SYSTEMS

BACKGROUND OF THE INVENTION

1. Field of the Invention

The present invention is directed to improvements in connector devices and relates more particularly to an improved connector device adapted to be mounted in the wall of a fiberglass duct of an air conditioning system and couple thereto a cylindrical flexible duct member.

2. The Prior Art

As conducive to an understanding of the present invention it should be recognized that increasing use is being made of air conduits or ducts comprised of semirigid, polymer bonded fibrous material. Such material has the advantage of being light in weight, inexpensive, and having a high thermal efficiency as contrasted, for instance, with metallic ducts, lined or unlined.

A drawback in the use of such ducting material is that, due to the fibrous nature thereof, conventional fasteners, such as sheet metal screws, rivets, etc. cannot be employed.

Fiber ducts are frequently used as a main conduit in conjunction with branches of cylindrical flexible conduit comprised of inner and outer liners having an interior insulation stuffing disposed between the liners, a helical metallic coil being mounted within the inner liner to assure that the conduit retains a cylindrical configuration.

Heretofore the tapping of cylindrical conduit into the wall of fiber duct has involved inserting a cylindrical collar through a complemental hole formed in the duct, bending portions of the collar interiorly of the duct radially outwardly, to define a flange, and thereafter sleeving the cylindrical duct end over the portions of the collar disposed outwardly of the duct. The inner layer of the flexible cylindrical duct is taped to the collar, and a plastic strap is disposed in encompassing relation of the duct and tightened to clamp the duct over the collar.

As will be apparent from the above description, the coupling of the flexible cylindrical duct to duct board as presently practiced provides an unsightly and lossy connection, largely dependent upon the skill of the installer.

SUMMARY OF THE INVENTION the present invention may be summarized as directed to an improved apparatus for coupling flexible cylindrical tubular duct to the wall of a fiber duct. The apparatus comprises a length of connector material consisting of two metal strips clampingly connected to a central vibration damping flexible strip or strips of fabric or the like.

The connector is used by forming the same into a cylindrical configuration whereby there are provided two metal cylindrical components connected by the fabric. One cylindrical component, which is inserted through the wall, includes on its outer surface gaskets which embrace the opposed surfaces of the wall. The other cylindrical component includes an internal gasket which surrounds the flexible cylindrical duct and a clamp member for maintaining the metal in a cylindrical configuration compressed against the duct, a cylindrical sleeve preferably having been inserted into the duct in alignment with the clamp.

It is accordingly an object of the invention to provide a connector member for use with fiber ducting systems which enables flexible cylindrical ducts to be conveniently and efficiently coupled to the fiberglass duct wall.

BRIEF DESCRIPTION OF THE DRAWINGS

FIG. 1 is a perspective view of a coupling device in accordance with the invention in assembled condition;

FIG. 2 is a vertical sectional view showing the device as applied in connecting relation of a cylindrical duct to the wall of a fibrous duct member;

FIG. 3 is a plan view of a connector in accordance with the invention as supplied and prior to its being conformed to the configuration of the cylindrical flexible duct;

FIG. 4 is a section taken on the line 4—4 of FIG. 3.

Referring now to the drawings and particularly FIGS. 3 and 4 thereof, there is shown a connector member 10 which comprises a pair of parallel metal strips 11, 12 having free marginal edges 13, 14 and inner marginal edges 15, 16. As best seen in FIG. 4, the inner marginal edges 15, 16 are clampingly bent over the distal margins 17, 18 of a flexible central web assembly 19.

Optionally but preferably, the web assembly 19 may comprise spaced fabric or like layers 20, 21, between which layers is sandwiched a mass of insulating material 22 which may comprise fiberglass or the like.

The structure thus far described is quite similar to flexible connector material as illustrated in U.S. Pat. No. 4,183,557 of Jan. 15, 1980.

The upper surface 23 of the strip 12 is provided with a spaced pair of compressible gasket members 24, 25 which are spaced by a distance (d) corresponding to the thickness of the wall 26 of the duct.

Gaskets 24, 25 run substantially the entire length of the connector device but terminate a distance short of edge 27.

The strip 12 is formed adjacent margin 27 with a tongue 28, the opposite end of the strip including a groove 29, complementally sized, slidably to receive the tongue 28, the parts together defining a slip joint.

the opposite strip 11 includes a complemental clamp apparatus, the components of which are secured adjacent the margins 30, 31 of the strip 11. More particularly, a receiver catch 32 is secured adjacent end 31 of the strip 11 and a toggle clamp member 33 is secured adjacent the margin 30.

The clamp member 33, which is known per se, includes a latch bail 34 and an operating handle 35. The under surface 36 of strip 11 is provided with a longitudinally extending gasket 37.

The device is shown in the assembled condition in FIG. 1 and in bridging condition between duct wall 26 and flexible cylindrical duct 38 in FIG. 2.

the device is applied by forming the member into a generally cylindrical configuration, with tongue 28 of strip 12 fully inserted into complemental groove 29. In this condition the end 39 may be inserted through aperture 40 in the duct wall 26 and thereafter allowed to expand, whereby the gasket members 24, 25 embrace the opposite surfaces of the duct wall 26. Optionally, a liquid adhesive may be applied at the interengaging surfaces to assure maximum stability and air tightness.

With the parts thus positioned and with the end 41 of the device in a slightly flared condition, the free end 42 of the flexible tubular duct 38 is introduced into the interior of the now convoluted strip 11.

Preferably a cylindrical metal collar 43 is inserted within the duct 38 in registry with the strip 11.

With the parts positioned as noted, the bail 34 of clamp 33 is engaged with latch 32 and lever 35 shifted to the position shown in FIG. 1, whereby the convoluted strip 11 is tightened about the duct 38.

The duct 38, as is conventional, includes an outer layer 44, an inner layer 45, and compressible insulating material 46 contained between the layers, whereby it will be perceived that the tightened convolute strip is impressed into the soft duct material, forming a tight seal in the area beneath the gasket 37.

The duct 38 includes a helical metallic member 47 which maintains the same against collapse from a cylindrical configuration. Notwithstanding the stability provided by the helical member it is nonetheless preferred to employ a collar 43.

At the connection of the end 41 it is also feasible to employ adhesives to assure complete air-tightness, the use of adhesive by no means being necessary.

As will be apparent to those skilled in the art and familiarized with the instant disclosure, numerous variations in details of construction may be made without departing from the spirit of the invention, which is accordingly to be broadly construed within the scope of the appended claims.

Having thus described the invention and illustrated its use, what is claimed as new and is desired to be secured by Letters Patent is:

1. A connector member for coupling a cylindrical flexible tubular duct to a wall of a fiber duct installation comprising an elongate band including a flexible central web assembly, a pair of sheet metal strips clampingly connected to the side marginal edges of said web assembly, said strips having an upper surface, an under surface and distal ends, said strips being disposed in parallel spaced relation, one said strip including on an upper surface thereof a spaced parallel pair of compressible gasket members extending upwardly beyond said surface, the spacing between said gasket members corresponding substantially to the thickness of said wall of said fiber duct, said one of said strips including at its distal ends interengageable complemental slip joint means for slidably connecting said distal ends in overlapping relation, the combination including complementary clamp means adjacent the distal ends of the other said strip for retaining said connector member in a cylindrical configuration.

2. A connector member in accordance with claim 1 wherein said slip joint means comprises a tongue adjacent a first said distal end extending parallel to the longitudinal axis of said strip and a tongue receiver groove adjacent a second said distal end and adapted slidably to receive said tongue.

3. A connector member in accordance with claim 1 wherein said other strip includes an inwardly directed compressible gasket member on the under surface of said strip.

4. A connector member in accordance with claim 1 wherein said central assembly is comprised of a pair of fabric layers having insulating material encompassed therebetween.

* * * * *